Dec. 20, 1955

CARL-ERIK GRANQVIST

ARRANGEMENT AT RADIO BEACONS 2,728,076

Filed April 4, 1951

2 Sheets-Sheet 1

INVENTOR
CARL ERIK GRANQVIST,

BY Larson and Whitney

ATTORNEYS

Dec. 20, 1955 CARL-ERIK GRANQVIST 2,728,076

ARRANGEMENT AT RADIO BEACONS

Filed April 4, 1951

2 Sheets-Sheet 2

INVENTOR
CARL ERIK GRANQVIST,

BY Larson and Whitney

ATTORNEYS

United States Patent Office 2,728,076
Patented Dec. 20, 1955

2,728,076

ARRANGEMENT AT RADIO BEACONS

Carl-Erik Granqvist, Lidingo, Sweden, assignor to Svenska Aktiebolaget Gasaccumulator, Lidingo, Sweden, a corporation of Sweden Application April 4, 1951, Serial No. 219,139

14 Claims. (Cl. 343—106)

The present invention refers to an arrangement at that kind of radio beacons, which is called "speaking-radio-beacons," that means a radio beacon which is acoustically in preferably usual language indicating the angle between the beacon and the receiver in relation to a known fixed direction, for instance the north-south-line, or with other words the bearing.

Such beacons should be made in such a way that the bearing indication is not heard except, when the signal from transmitter antenna system, from which the beacon emanates, is directed exactly onto the receiver. For this reason, the antenna system should be provided in such a way and so connected to the transmitter of the beacon, that a rotating direction characteristic is obtained. What rotation speed should be used for the rotating direction characteristic is, in the first place, dependent upon the time, required for the information about the bearing indication and also in what manner this is indicated. If, for instance, one is indicating the bearing in the form of an acoustic statement in usual human language for every ten bearing degrees, the bearing information at, for instance 340°, should be the word "thirty-four," or the corresponding word in another language. For international purposes, the English language should be most suitable, in which case the bearing indication should be "thirty-four." Experiments made have proved that this bearing indication as well as the necessary interval, when expressed in the most suitable spoken speed, will take a time of about 1.33 seconds.

If one, now, should give the bearing information, for instance for every twenty degrees, the maximum speed of rotation of the field would be one turn in 24 seconds. In practice, however, it is impossible to provide such a movement of the antenna system or the direction characteristic, respectively, that this will, in an infinitely short time, pass from one 20 degree bearing to the next one, but one has to let the characteristic rotate with a substantially even speed. Assuming now, that the bearing information is transmitted during an angle of 10°, and that thereafter the characteristic is silently rotating during further 10°, before the next bearing indication is transmitted, the time of one turn is doubled to 48 seconds.

In practical use, it is however, for most cases necessary to give the bearing indication in smaller angular distances, for instance for every ten degrees, but it is also desired that the bearing indications should occur with shorter intervals than 48 seconds. The present invention refers to an arrangement by which these requirements are satisfied.

According to the invention, the beacon is arranged in such a way that the bearing indication is transmitted at a given bearing with predetermined intervals of time, corresponding to predetermined angular distances, and a contra bearing thereto is transmitted during the silent intervals between the first mentioned bearing transmissions. Further details of the invention will be evident from the following specification, describing one form of execution of the invention.

In the attached drawing, Fig. 1 shows in diagram the principle of the invention.

Figure 1:
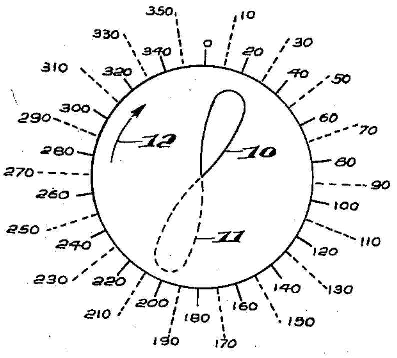

In Fig. 1, a wind rose is indicated, in which the direct bearings are indicated by means of fulldrawn lines, the bearings thus being 0°, 20°, 40°, 60°, and so on. With dotted lines, the contra bearings are indicated which are, thus, 10°, 30°, 50°, 70°, and so on. Further, in the interior of the wind-rose the direction characteristic of the beacon is drawn. This is reversible, so that, when transmitting a direct bearing, it may for instance have the form, indicated by full lines, and when transmitting a contra bearing, the form indicated by dotted lines. The former characteristic is indicated 10, and the latter one 11. The arrow 12 indicates the rotation direction in the space of the characteristics.

Figure 2:
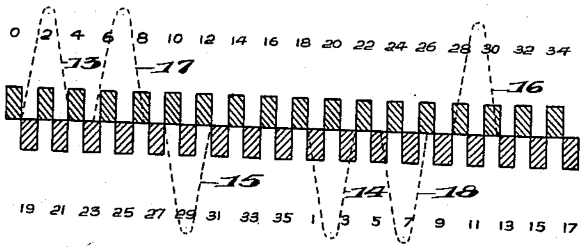
Fig. 2 shows a signal diagram of the bearing indications in a diagram developed in the plane.

Fig. 2 shows a time diagram of the different bearing transmissions. At the bearing 0 thus there is transmitted during a time, which may for instance be equal to 1.33 seconds, above mentioned as an example of said time, the bearing indication "zero." In reality, however, the direction characteristic passes during a continuous movement from minus 5° to plus 5° bearing during this indication. During the rotation, thereafter following from 5° to 15° bearing, the direction characteristic is reversed and transmits the bearing indication "nineteen," corresponding to a mean angle of 190° or an angular interval of 185° to 195°. Thereafter, the direction characteristic is again reversed, so that it obtains its initial direction in relation to the antenna, but meantime, in a mechanical or electrical way, a rotation has been provided, so that the bearing indication "two" is now transmitted, indicating a mean angle of 20°, and so on.

It is now understood that a receiver, situated in a bearing of 20° relative to the transmitter at the transmission, above mentioned as direct transmission, will hear the bearing indication "two," but after the direction characteristic has rotated practically one half turn, the same receiver will first hear the bearing indication "one" and shortly thereafter the bearing indication "three." The intensity of these indications will be seen from the resonance curves 13 and 14, respectively, drawn at said bearings. It is seen from these curves, that the bearing indication "two" will be heard with full intensity, whereas the two contra bearings of the direct bearing 22, that means "one" and "three," placed on both sides of first mentioned indication, will be heard with weaker intensity.

A pilot, accustomed to air beacons of the kind here described will have no difficulty in hearing such a bearing indication. The unusual feature is, however, that in this way he will obtain twice the bearing indications he should have obtained with a normal rotating beacon without reversal of characteristics. But furthermore he will obtain the bearing indication of twice as many angular positions. In a single air beacon of the known kind, he would with maintained indication frequency only have obtained one indication every twenty degrees. With the beacon according to the invention he will obtain one indication every ten degrees. If he, for instance, is placed in 290° bearing, he will get a statement thereabout with full sound intensity, due to the characteristic 15, but one half turn later, he will also obtain the complementary indication of 280° and 300°, respectively, with a weaker sound intensity.

In the abovementioned cases it was presumed that the receiver was placed in an exact certain ten degrees of bearing in relation to the transmitter. But also at other positions one may obtain a very good estimation of the bearing, as will be evident from the following example: Assuming that the receiver is placed in 65° bearing in relation to the transmitter, it will first receive the signal according to curve 17. The pilot will hear the bearing indication "six" rather strongly and beside, an interrupted part of the indication "eight," about which he, however, need not care. Half a turn later on he will according to curve 18 first hear an interrupted part of the indication "five," which he does not regard, but thereafter he will hear all of the indication "seven." By taking the mean value of the indications "six" and "seven," he will get to 6.5, which will tell him that his correct bearing is 65°.

If he should hear the bearings with different sound intensity, he will as a rule be able to estimate the bearing within one or two degrees.

In air traffic within the close range of the air field, however—excepting the proper landing for the purpose of which other taking down systems are provided—a bearing indication within 10° is very satisfactory.

All directed antenna systems which may be used for radio beacons of the kind here in question have so called side lobes. A direction characteristic for such an antenna system has been given as an example with dotted lines in Fig. 3. The two bearing diagrams are, now as earlier, indicated 10 and 11, but furthermore there are four side lobes 19, 20, 21, and 22, the influence of which can not be quite neglected. In order to suppress disturbing transmission due to these side lobes and at same time to give the beacon an indication for identification, the beacon is, according to a further development of the invention, provided with an extra antenna system of figure-8-like characteristic. The two lobes of the last mentioned characteristic should have their axis perpendicular to the axis of the lobes 10 and 11. The two said lobes are in Fig. 3 indicated 23 and 24, respectively.

An especially suitable arrangement is one, where by means of the last mentioned antenna, which has a figure-8-like characteristic, a tone signal of, for instance, 1000 C. P. S. is transmitted alternatively with an identification code which may be repeated, for instance every tenth second and have a duration of, for instance, 1 or 2 seconds. The tone signal should, preferably, be modulated to 100%. However, it could occur that a receiver is in a bearing, corresponding to a side lobe. In such a case, the pilot would repeatedly hear partly the false bearing indication from the side lobe, and partly superimposed on same the identification signal, and this should be avoided. In order to prevent false reading of the indications, emanating from such a state, it is suitable to control the change of modulation with a somewhat deviating periodicity, so that, for instance, the tone modulator describes 98 or 97% of one turn during the same time, in which the signal rotates a full turn. Thereby a displacement of the periodicity of the identification signals and the covering signals interposed between said signals is created, which does not influence the indication, said covering signals being assumed to have a frequency of 1000 cycles, and the receiver will no longer at repeated occurrences hear the identification signal and the false bearing indication from a side lobe simultaneously.

Figure 4:
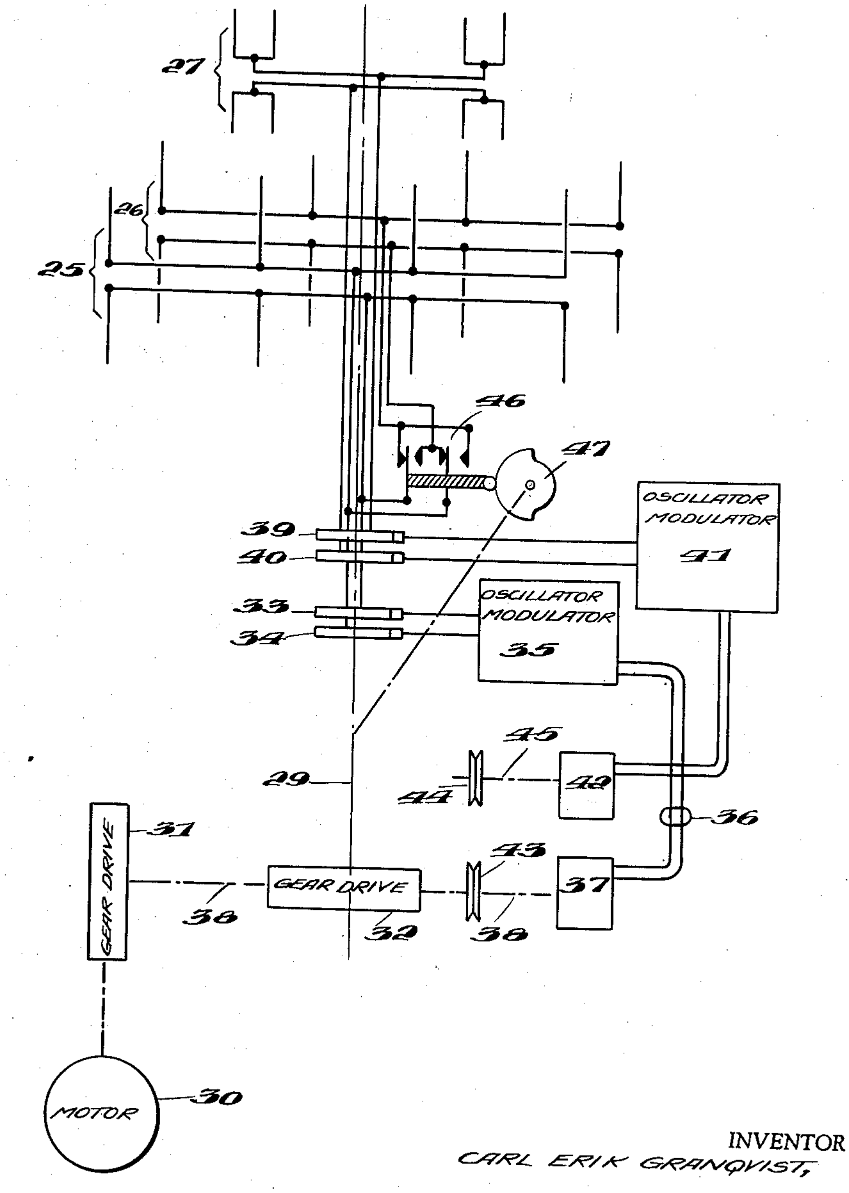
Fig. 4 shows schematically, partly in block diagram, one form of execution of the invention, the function of which is described by means of the above indicated diagrams.

Fig. 4 shows a form of execution of the invention. The antenna consists here of a series of dipole antennas of the type, called "broad-side-antenna." Each dipole antenna has, in the usual manner, one branch directed upwards and one branch directed downwards, each having an extension of ¼ wavelength. A number of such dipole antennas—in the shown form of execution four such antennas—are applied in a level of parallel extension and in a mutual distance of ½ wave-length. In a parallel level at a distance of ¼ wave-length a group of dipole antennas of the same kind is provided. The first mentioned group is in the drawing indicated at 25, and the latter one at 26. The antenna now described has for its purpose to transmit the bearing indications.

In addition to this antenna, a further antenna is provided, preferably immediately above the first mentioned one. This last antenna may be of any suitable kind, capable of transmitting a field with figure-8-like characteristic, but it is especially advantageous to use a dipole antenna of a special kind. This is made of four dipole antenna units, each containing one upward directed branch and one downward directed branch. The dipole antenna units are co-ordinated two and two and arranged at a distance of ⅛ wave-length from each other. The distance between the centre-lines of each of the groups, thus created, is ¾ of a wave-length. Such an antenna transmits a field with a figure-8-diagram, which will, during a great part of a turn, closely approach a circle.

Figure 3:
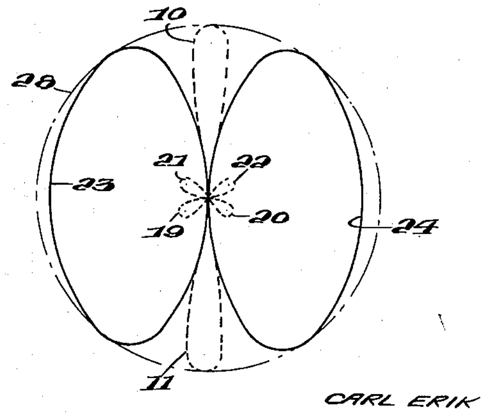
Fig. 3 shows the transmission diagram of an antenna, used in an arrangement according to the invention, in a further development of same.

In Fig. 4, the antenna is indicated at 27, and in Fig. 3 its field has been drawn in the form of a covering field diagram 23—24. In Fig. 3 there is, as a comparison, inserted a circle 28 from which will be seen that the field is very closely constant in such parts, where there is no transmission by means of the bearing indicating diagram.

All of the antennas are placed on a shaft 29 which is arranged to rotate with constant speed, equal to the number of revolutions, desired for the field rotation, that means if one follows the example given above, one revolution in 48 seconds. This low speed is achieved by gearing down the speed of the motor 30 two times successively by means of worm gears 31 and 32 respectively.

The antennas 25—26 are fed over feeding lines, following the shaft 29, as well as over two slip rings 33, 34, concentrically applied on the shaft 29. The voltage is derived from an oscillator-modulator 35, the tone frequency of which is applied over conduits 36 from a tone mechanism 37. The tone mechanism is preferably a magnetophone with amplifier, driven in absolute synchronism with the intermediate shaft 38 between the two worm gears 31 and 32, preferably directly arranged on said shaft. Therefore, a correct bearing indication will always be given in every separate position during the rotation of the shaft 29.

The antenna 27 is in a corresponding way fed over one pair of slip rings 39—40, an oscillator-modulator 41, and a tone mechanism 42. In this case it is, however, of some importance that the tone mechanism 42 should not run synchronously with the shaft 29. It is therefore connected with the intermediate shaft 38 by means of a speed changing gear, for instance a wedge pulley gear with the two belt pulleys 43 and 44 which should have such dimensions that the number of revolutions of the shaft 45 is, for instance, 97 or 98% of that of the shaft 38.

For reversing the diagram of the antenna system 25—26, the feeder line is finely branched to the antenna 26 and the branch conduit is carried over a pole reverser of some suitable kind. By these means the total length of the feeder conduit from the branch point to the antenna 25 is one quarter of a wave-length shorter than the total length of the feeder conduits from same branch point to the antenna 26. Consequently there will be created a displacement of phase of one quarter of a wave-length of 90° between the radiations from the two antennas 25 and 26. A further displacement of phase between these radiations is created due to the propagation time from the level of one of the antennas to the level of another one of the antennas, and the consequence of this will be, that with one position of the pole reverser 46, the radiation from the antenna 26 in the direction through the antenna 25 will extinguish the radiation from the antenna 25, whereas in the other direction of radiation, the radiation from antenna 25 will add to the radiation from antenna 26. Consequently, only the radiation diagram indicated for instance by 10 in Fig. 1 will be obtained. If the pole reverser 46 is transferred into its other position, however, the phase displacement of one quarter of a wave-length will be in the opposite direction, and in this case, the radiations from the antennas 26 and 25 will cooperate in the reversed direction, causing the radiation diagram 11, and extinguish each other in the first mentioned direction, so that no radiation diagram will be obtained, like the diagram 10 of Fig. 1. Even if this pole reverser 46 has, in the drawing, been shown in the form of mechanically reversible switches, so is it obvious that for this purpose can instead every known kind of device be used, for instance an inductive or a capacitive pole reverser.

The pole reverser 46 is controlled by means of the cam disc mechanism 47 which is put into rotation by means of the shaft 29. Once during every half bearing step the polarity of the antenna 26 is thus reversed. In the above indicated manner, the antenna system 25—26 will then during the period of one polarity transmit the direct bearing and during the next period of polarity it will transmit the contra bearing. The gearing means between the shaft 29 and the cam disc mechanism 47 are not shown in the drawing. They may preferably be a simple cog gearing.

The invention is, of course, not limited to the form of execution, above described and shown in the drawing, but different modifications may be made within the scope of the invention. For the principle of the invention it is, thus, not necessary to use dipole antennas, but every other kind of antennas may be used with just as good effect. It is not necessary that the tone mechanisms 37 and 42 are magnetophonic, but other tone mechanisms may also be used, and it is even not necessary that "spoken sound" is reproduced, but that sound could with quite as good effect be replaced by a suitable code of some kind of tone frequency. Finally, both of the antennas have, in the drawing, been shown as placed above each other. This was, however, only made for reason of convenience. As a matter of fact, it may cause difficulties to conduct the feeder lines to the two antennas in such a way, that they do not influence each other, and it may therefore be suitable, instead to arrange the antennas at the side of each other in some small distance.

What I claim is:

1. A radio beacon transmitter comprising, means for transmitting a directed beam, means rotating said beam, means periodically modulating said beam at predetermined regular intervals with intelligence indicating the angular directions of said beam, and means reversing the direction of said beam between intervals, more than two such reversals occurring during each complete revolution of said beam.

2. A radio beacon transmitter according to claim 1 in which said modulating means includes means for imposing intelligence, corresponding to every twentieth angular degree, on said beam when in a first direction, and corresponding to every twentieth degree plus 10°, when in its reversed direction.

3. A radio beacon transmitter according to claim 1 in which the directed beam is uni-directional and is alternatively switched from one side to the other one, said radio beacon containing means transmitting a covering signal between the two alternative lobes to said first mentioned beam.

4. A radio beacon transmitter according to claim 3 in which the covering signal is modulated with an intelligence signal of such a character as to indicate the identity of the beacon, alternating with said directed beam.

5. A radio beacon transmitter according to claim 4 in which said covering signal transmitting means includes phase displacing means to angularly displace said directed beam from said covering signal from turn to turn.

6. A radio beacon transmitter according to claim 5 in which said displacement is between 2% and 3%.

7. A radio beacon according to claim 4, in which the means transmitting the covering signal and the directed beam consist of a mechanically rotating dipole antenna system.

8. A radio beacon according to claim 7, in which the means transmitting the covering signal and the directed beam consist of a number of dipole antennas provided in one plane.

9. A radio beacon according to claim 8, in which the means transmitting the covering signal and the identification signal consist of two pairs of dipole antennas, said pairs of dipole antennas being situated in a mutual centre distance of about ¾ of a wave-length, and the distance between the two antennas in same pair being about ⅛ of a wave-length.

10. A radio beacon according to claim 7, in which one oscillator-modulator is connected to each of the two means, each of said oscillator-modulators being fed from one tone mechanism, indicating the bearing indication, and the covering signal and identification signal, respectively.

11. A radio beacon transmitter according to claim 1, and an antenna in said transmitting means comprising dipole antennas with sharp direction action in a single direction.

12. A radio beacon according to claim 11, in which the antenna transmitting the bearing indications consists of two dipole antennas provided in two parallel planes, said planes being situated in substantially ¼ of a wave-length mutual distance, and the dipole antennas provided in each of said planes being situated in a mutual distance of ½ of a wave-length, each half part of such a dipole antenna finally having a length of ¼ of a wave-length.

13. A radio beacon according to claim 12, in which a device for reversal of the phase of the dipole antennas provided in one of the planes.

14. A radio beacon according to claim 13, in which the device for phase reversal is controlled by means of a cam disc mechanism, driven over a gear from a shaft providing the rotation of the antenna systems.

References Cited in the file of this patent

UNITED STATES PATENTS

| | | |
|---|---|---|
| 2,045,904 | Furnival et al. | June 30, 1936 |
| 2,279,031 | Cockerell et al. | Apr. 7, 1942 |
| 2,308,019 | Morawetz | Jan. 12, 1943 |
| 2,424,079 | Dome | July 15, 1947 |
| 2,528,543 | Peterson et al. | Nov. 7, 1950 |

FOREIGN PATENTS

| | | |
|---|---|---|
| 467,013 | Great Britain | June 9, 1937 |